(12) United States Patent
Alberhasky et al.

(10) Patent No.: US 6,514,341 B1
(45) Date of Patent: Feb. 4, 2003

(54) METHOD AND APPARATUS FOR REMOVING OPTICAL FIBER

(75) Inventors: Craig Alan Alberhasky, Ralston, NE (US); Scott Lyn Karstens, Gretna, NE (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/541,579

(22) Filed: Apr. 3, 2000

(51) Int. Cl.[7] .............................................. B05C 11/02
(52) U.S. Cl. ..................... 118/125; 118/410; 425/113; 425/192 R
(58) Field of Search ......................... 425/133.1, 192 R, 425/113; 118/419, 410, 125

(56) References Cited

U.S. PATENT DOCUMENTS

| | | | | |
|---|---|---|---|---|
| 3,856,448 A | * | 12/1974 | Iijima et al. | 425/133.1 |
| 4,111,630 A | * | 9/1978 | Shiomi et al. | 425/133.1 |
| 4,770,620 A | * | 9/1988 | Steinecke et al. | 425/133.1 |

* cited by examiner

Primary Examiner—Brenda A. Lamb
(74) Attorney, Agent, or Firm—Thomas, Kayden, Horstemeyer & Risley, LLP

(57) ABSTRACT

The present disclosure relates to an extruder head for applying a coating of material on a communications medium. The extruder head comprises an extruder head housing having an entrance end, an exit end, and an interior passage that extends from the entrance end to the exit end. A capsule is disposed within the extruder head housing in its interior passage and is pivotally mounted therein at a central portion of the capsule. Disposed within an interior passage of the capsule is a die which is axially aligned with the central portion of the capsule.

22 Claims, 10 Drawing Sheets

METHOD AND APPARATUS FOR REMOVING OPTICAL FIBER

FIELD OF THE INVENTION

The present disclosure relates to an extruder head for coating communications media. More particularly, the disclosure relates to an extruder head for evenly applying coatings, such as electrical insulation, over conductors such as copper wire.

BACKGROUND OF THE INVENTION

Communication media such as metal wires and optical fibers typically are coated with polymeric materials to provide insulation and/or mechanical protection to the media. Normally, these coatings are applied with extruder heads through which the communication medium passes during manufacturing. The extruder head receives a flow of molten polymeric material and directs it to an internal core tube and die through which the communication medium travels. These elements are provided with central apertures which are sized and configured so as to be slightly larger than the diameter of the communications medium such that, as the communications medium passes through the core tube and die, it is coated with the desired amount of polymeric material.

Conventional extruder heads support the core tube and die with an inner support tube or barrel arranged longitudinally within the head in the direction of travel of the communications medium. This tube is typically provided with a flange at its first end with which it can be bolted inside the extruder head adjacent its entrance end. Adjacent the exit end of the extruder head is a plurality of set screws which are threaded through the extruder head housing and abut a second end of the support tube. With these set screws, the attitude of the support tube, as well as the communications medium, can be adjusted.

Unfortunately, conventional extruder heads present several manufacturing disadvantages. First and foremost, adjustment of the head, in an effort to obtain even application of coatings, is difficult. To make such an adjustment in a conventional extruder head, the manufacturing line first must be shut down, wasting valuable production time. Once the line has been shut down, the set screws are adjusted. Since the support tube is bolted to the extruder head at its first end, adjustment of the set screws causes the support tube to pivot, albeit to a small degree, about its first end instead of the point at which the coating is applied to the communications medium. In addition, due to this configuration, the support tube makes physical contact with the communications medium to align it with the core tube and die instead of just aligning the core tube and die with the medium. Because of this, it is difficult to achieve even coating of the communications medium. Moreover, due to the contact made between the support tube and the communications medium, unwanted stresses are imparted to the medium, resulting in an inferior product.

In addition to the aforementioned disadvantages, the configuration of conventional extruder heads makes it difficult to obtain even heating of the head. This results in the formation of cold spots at various places in the head which, in turn, can create other manufacturing difficulties. Furthermore, the configuration of conventional extruder heads raises the manufacturing costs of the extruder heads, therefore, raising the purchase price of such extruder heads.

From the foregoing, it can be appreciated that it would be desirable to have an extruder head which can consistently apply even coatings of polymeric material to a communications medium without making unnecessary contact with the communications medium. Furthermore, it would be desirable to have such an extruder head which allows for adjustment "on the fly" and which also provides for even heating thereof.

SUMMARY OF THE INVENTION

The present disclosure relates to an extruder head for applying a coating of material on a communications medium. The extruder head comprises an extruder head housing having an entrance end, an exit end, and an interior passage that extends from the entrance end to the exit end. A capsule is disposed within the extruder head housing in its interior passage and is pivotally mounted therein at a central portion of the capsule. Like the extruder head housing, the capsule has an entrance end, an exit end, and an interior passage that extends from the capsule entrance end to the capsule exit end. The capsule further includes a die disposed within its interior passage that has an aperture through which the communications medium can pass which is substantially axially aligned with the central portion of the capsule. In addition, the extruder head includes an adjustment mechanism for adjusting the orientation of the capsule within the extruder head housing.

In a preferred arrangement, a socket portion is formed within the interior passage of the extruder head housing that is adapted to receive a ball portion of the capsule. With this configuration, a ball and socket arrangement is formed such that the capsule can be pivoted about its ball portion. With this arrangement, particularly advantageous results can be obtained.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Structural Orientation

Figure 1:
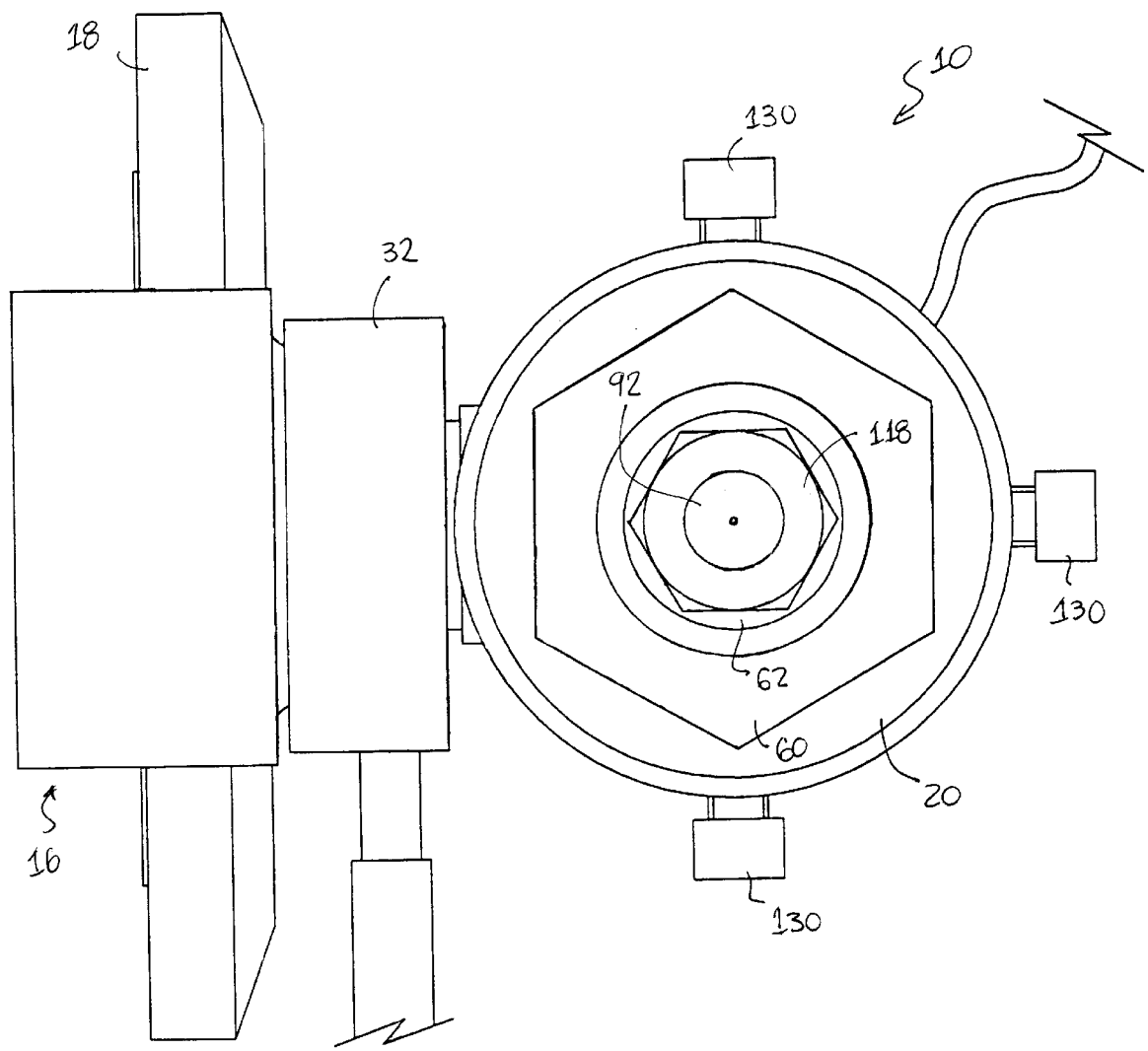
FIG. 1 is an entrance end view of an embodiment of an extruder head constructed in accordance with the principles of the present invention.
Figure 2:
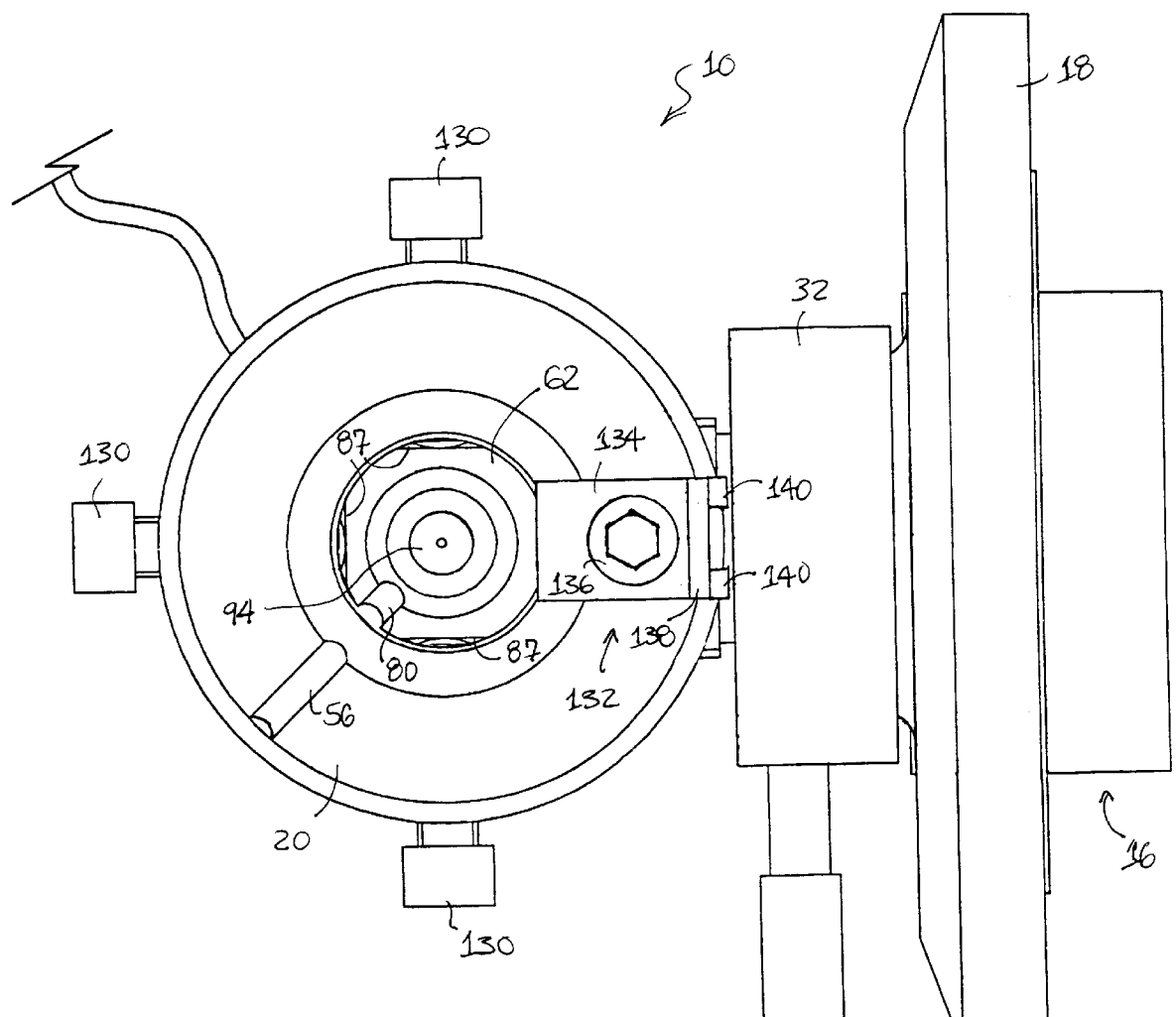
FIG. 2 is an exit end view of the extruder head shown in FIG. 1.
Figure 3:
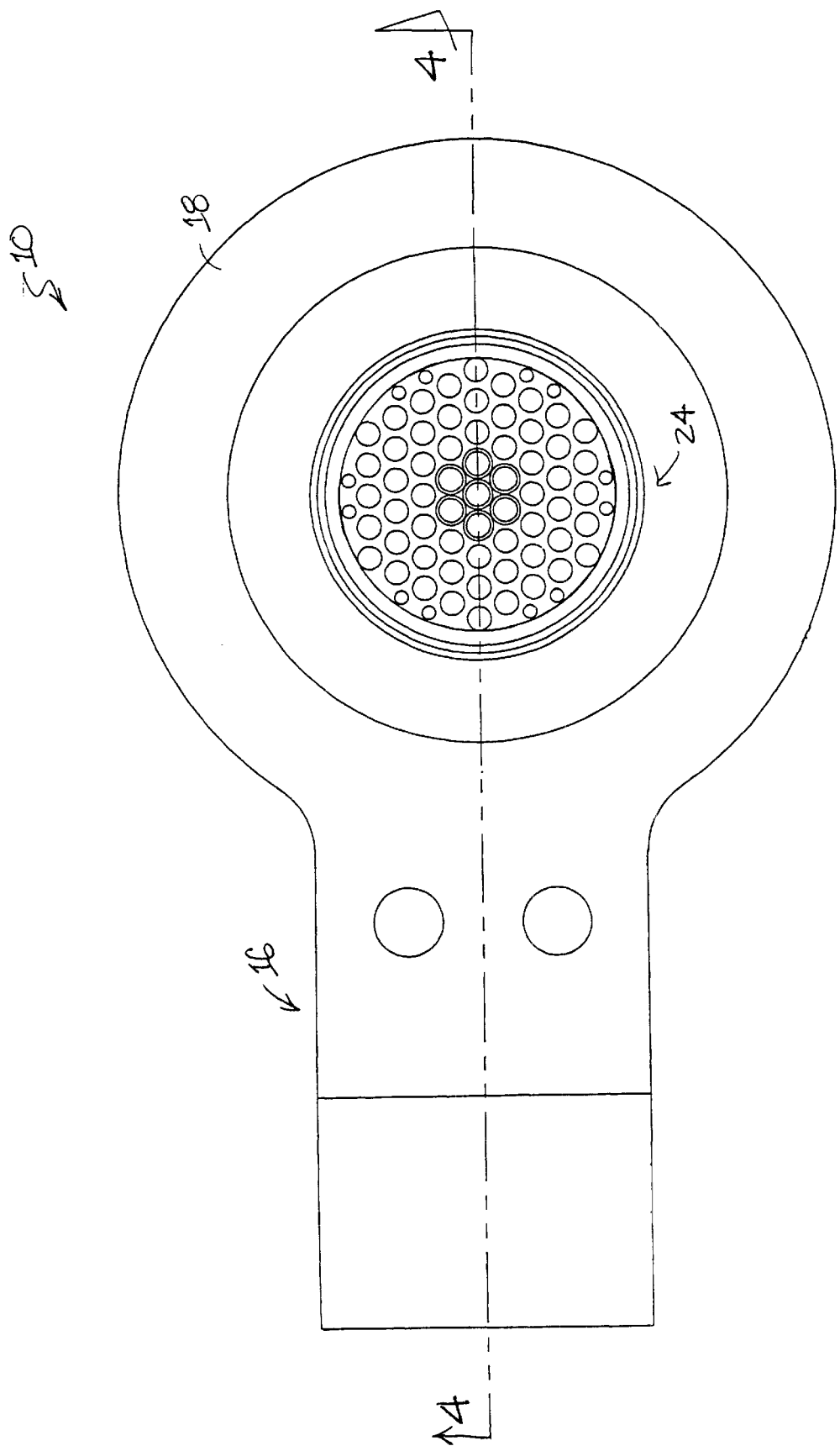
FIG. 3 is a side view of the extruder head shown in FIGS. 1 and 2, illustrating a breaker plate thereof.
Figure 4:
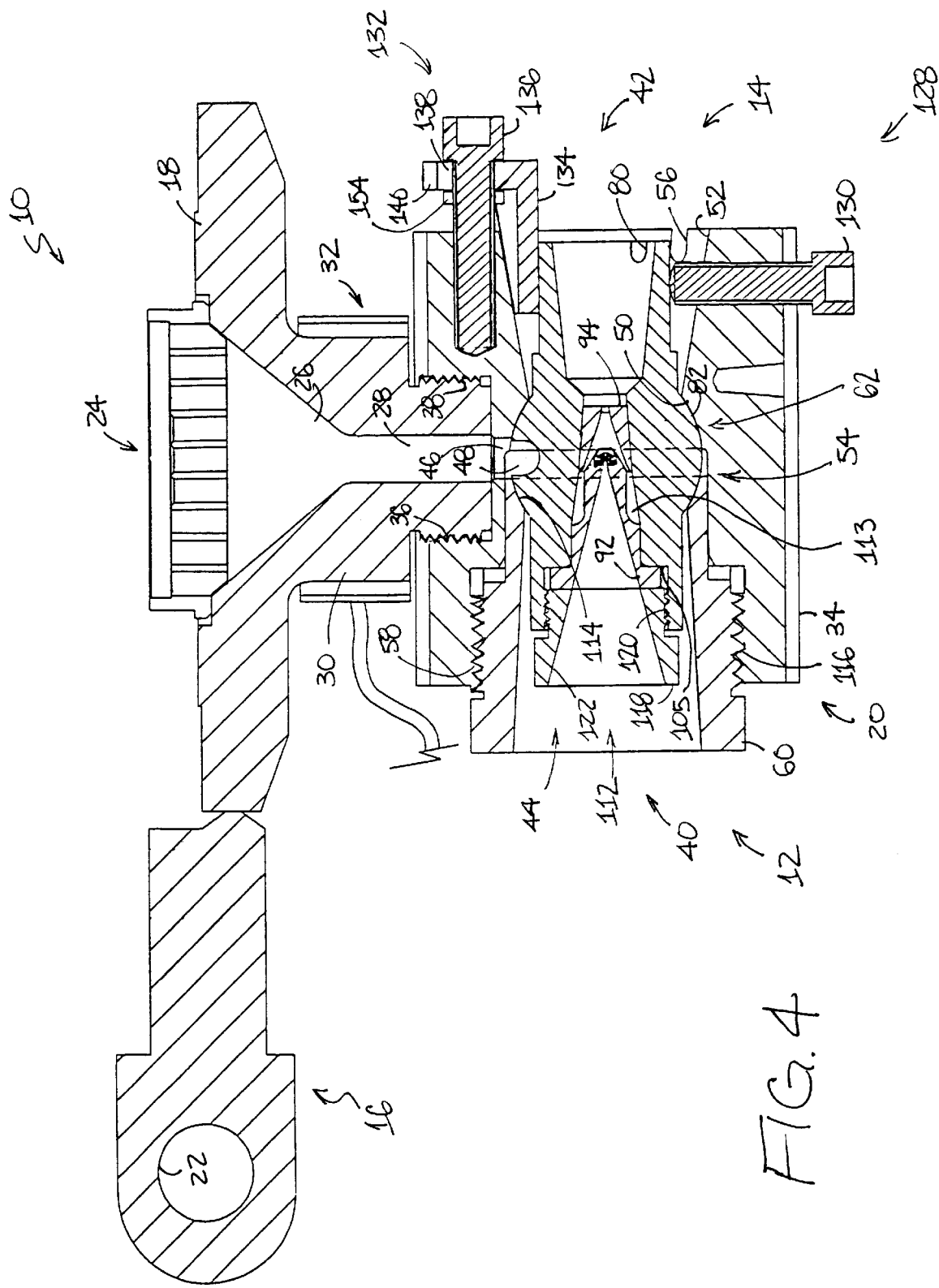
FIG. 4 is a cross-sectional view of the extruder head shown in FIGS. 1–3 taken along line 4—4 in FIG. 3.

Referring now in more detail to the drawings, in which like numerals indicate corresponding parts throughout the several views, FIGS. 1–4 illustrate an embodiment of an extruder head 10 constructed in accordance with the principles of the present invention. In particular, FIG. 1 illustrates an entrance end 12 of the extruder head 10, FIG. 2 illustrates an exit end 14 of the extruder head, FIG. 3 illustrates a side view of the extruder head 10, and FIG. 4 illustrates a cross-sectional top view of the extruder head 10 taken along lines 4–4 shown in FIG. 3.

With specific reference to FIG. 4, the extruder head 10 generally comprises a pivot arm 16, an extruder head flange 18, and an extruder head housing 20. The pivot arm 16 is provided with a pivot opening 22 about which the extruder head 10 can be pivoted when production is halted to service the extruder head 10 and/or any other components operating therewith. Connected to the pivot arm 16 is the extruder head flange 18. Typically, the extruder head flange 18 is fixedly attached to the pivot arm 16 as by welding, such that the pivot arm 16 and extruder head flange 18 together form a single integral component. As indicated most clearly in FIGS. 3 and 4, the extruder head flange 18 includes a breaker plate 24 through which molten polymeric material to be applied to the communications medium flows. As known in the art, the breaker plate 24 typically incorporates a screen filter (not shown) which serves to diffuse the flow of molten polymeric material before this material is brought in contact with the communications medium. Downstream from the breaker plate 24 is a funnel section 26 of the extruder head flange 18 which directs the flow of molten polymeric material to a passage 28. This passage 28 extends through a neck portion 30 of the extruder head flange 18 which, as indicated in FIG. 4, extends outwardly from the funnel section 26. Normally disposed about the neck portion 30 of the extruder head flange 18 is a temperature measuring device 32 which preferably comprises a thermocouple. As is known in the art, this temperature measuring device 32 measures the temperature of the extruder head 10 at the neck portion 30 of the extruder head flange 18 to provide an indication of the temperature at which the extruder head 10 is being maintained in response to heat provided by a heater band 34 which is disposed about the extruder head housing 20. Extending further from the extruder head flange 18 is a threaded portion 36 of the extruder head flange 18. As illustrated in FIG. 4, this threaded portion 36 is sized and configured to couple with the extruder head housing 20.

With further reference to FIG. 4, the extruder head housing 20 is provided with a threaded aperture 38 which is sized and configured to receive the threaded portion 36 of the extruder head flange 18. As indicated by FIGS. 1, 2, and 4, the extruder head housing 20 is substantially cylindrical in shape. As shown most clearly in FIG. 4, the extruder head housing 20 includes an entrance end 40 and an exit end 42. Extending along the longitudinal axis of the extruder head housing 20 is an interior passage 44 which passes from the entrance end 40 to the exit end 42 of the extruder head housing 20. Extending laterally from the interior passage 44 to the passage 28 provided in the extruder head flange 18 is a further passage 46. This passage 46 is aligned with an interior groove 48 (shown with dashed lines in FIG. 4) which, in a preferred arrangement, annularly traverses the interior passage 44 through 360°. Formed within the housing adjacent this interior groove 48 is a first socket portion 50 which, like the interior groove 48, preferably annularly traverses the interior passage 44 through 360°. Extending from the first socket portion 50 to the exit end 42 of the extruder head housing 20 is a tapered portion 52 of the interior passage 44. As indicated in FIG. 4, this tapered portion 52 preferably widens in the direction of the exit end 42 such that the tapered portion 52 tapers inwardly from the exit end 42 toward a central portion 54 of the extruder head housing 20. In a preferred arrangement, the tapered portion 52 of the interior passage 44 is provided with an alignment notch 56, the purpose for which is explained below. Adjacent the entrance end 40 of the extruder head housing 20 is a threaded portion 58 which, as is described in the following, is sized and configured to receive a capsule nut 60.

Disposed within the interior passage 44 is a capsule 62. This capsule 62 is shown independently in FIGS. 5 and 6. As illustrated in these figures, the capsule 62 is generally cylindrical in shape and, like the extruder head housing 20, comprises an entrance end 64 and an exit end 66. Formed at the entrance end 64 is an entrance opening 68. Likewise, formed at the exit end 66 is an exit opening 70. Extending from the entrance opening 68 to the exit end opening 70 is an interior passage 72. In a preferred arrangement, the interior passage 72 generally comprises three separate sections which are aligned in series. In particular, the interior passage 72 includes an internally threaded portion 74, a first tapered portion 76, and a second tapered portion 78. The internally threaded portion 74 is sized and configured to receive a core tube nut 118, described hereinafter. The first tapered portion 76 extends from the threaded portion 74 to the second tapered portion 78 tapering inwardly as it does so. In contradistinction, the second tapered portion 78 tapers outwardly from the first tapered portion 76 to the exit opening 70 and exit end 66 of capsule 62. Formed in the second tapered portion 78 adjacent the exit end 66 is an alignment notch 80 that is in radial alignment with the alignment notch 56 of the housing 20.

Figure 5:
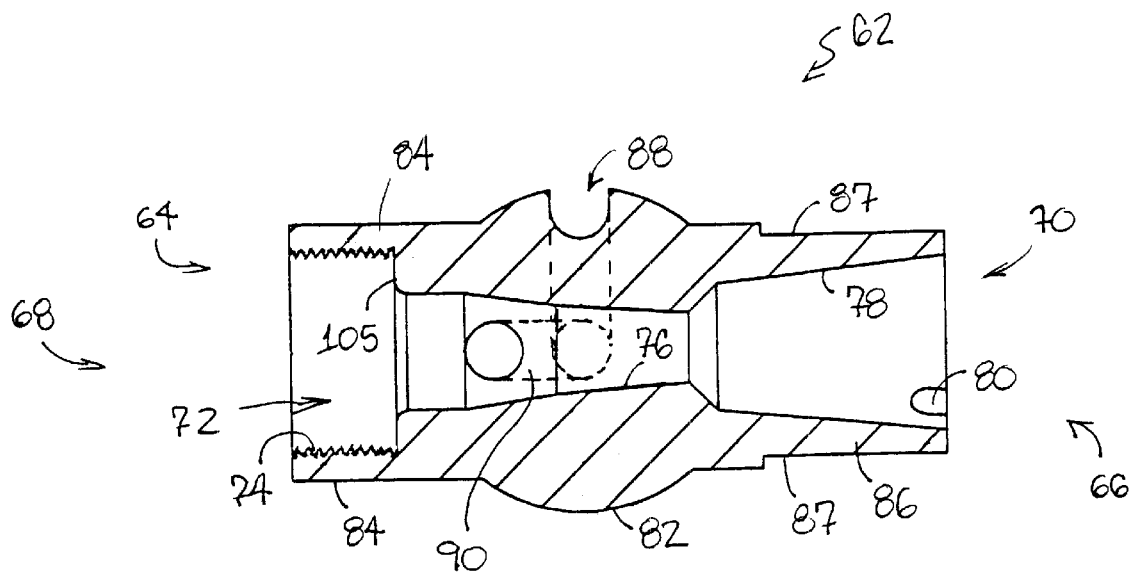
FIG. 5 is a cross-sectional view of a capsule of the extruder head shown in FIG. 4.
Figure 6:
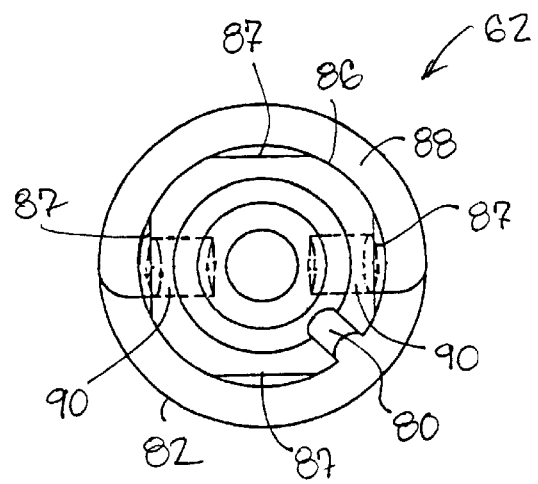
FIG. 6 is an exit end view of the capsule shown in FIG. 5.

As indicated in FIG. 5, the capsule 62 preferably comprises a ball portion 82. The ball portion 82 normally is formed at a central portion of the capsule 62. Extending outwardly from the ball portion 82 is a first extension tube 84 which incorporates the threaded portion 74, and a second extension tube 86 which incorporates the second tapered portion 78. Typically, the second extension tube 86 includes a plurality of flats 87 formed in its outer surface used for aligning the capsule 62 within the housing 20. Preferably, four such flats 87 are provided, each radially spaced 90° from the next (FIG. 5). Formed peripherally about at least a portion of the circumference of the ball portion 82 is a groove 88. As illustrated in FIG. 4, this groove 88 aligns with the interior groove 48 provided in the extruder head housing 20 when the capsule 62 is disposed therein. Turning back to FIG. 5, the capsule 62 further includes at least one material port 90. As indicated in FIG. 5, as well as FIG. 6, these material ports 90 extend from the groove 88 formed in the ball portion 82 to the first tapered portion 76 of the interior passage 72 such that molten polymeric materials provided to the groove 88 of the capsule 62, under pressure, will flow from the groove 88, through the material ports 90, and into the first tapered portion 76 of the interior passage 72.

Figure 7:
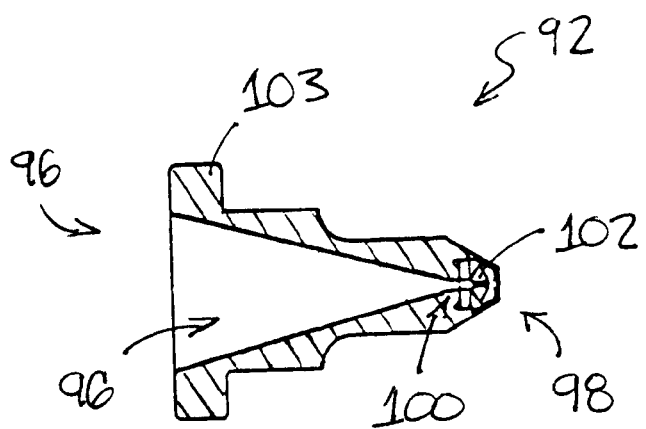
FIG. 7 is a cross-sectional view of a core tube shown in FIG. 4.

Returning to FIG. 4, the capsule 62 can be provided with an internal core tube 92 disposed within the interior passage 72. In addition, the capsule 62 further includes a die 94 which is disposed within the interior passage 72 of the capsule 62 at a point downstream of the core tube 92. The core tube 92 and die 94 shown in FIG. 4 are illustrated independently in FIGS. 7 and 8, respectively. As shown in FIG. 7, the core tube 92 is substantially elongated in shape and comprises a first end 96 and a second end 98. Extending from the first end 96 to the second end 98 is an interior passage 96. This interior passage 96 begins with a relatively open orientation and tapers inwardly toward the second end 98 until finally forming a narrow aperture 100 adjacent the second end 98 of the core tube 92. Positioned within the core tube 92 at its second end 98 adjacent the narrow aperture 100 is a core tube element 102 which, as is known in the art, typically comprises a diamond element having its own aperture that is in alignment with the narrow aperture 100. Formed adjacent the first end 96 of the core tube 92 is a flanged portion 103 which is shaped and configured to abut an interior shoulder 105 formed within the interior passage 72 of the capsule 62 (FIG. 4). With this arrangement, the core tube 92 can be inserted within the capsule 62 and, when positioned such that the flanged portion 103 of the core tube 92 abuts the interior shoulder 105 of the capsule, the core tube 92 will be positioned in a desired orientation within the capsule 62, i.e., one in which the communications medium passing through the extruder head housing 20 will be coated with an even layer of polymeric material.

Figure 8:
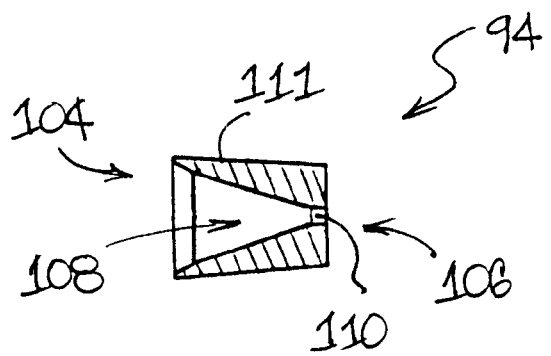
FIG. 8 is a cross-sectional view of a die shown in FIG. 4.

Referring to FIG. 8, the die 94 normally also is elongated in shape and has a first end 104 and a second end 106. Extending from the first end 104 to the second end 106 is an interior passage 108 which, like the interior passage 96 formed within the core tube 92, gradually tapers inwardly from the first end 104 to the second end 106 to finally form a narrow aperture 110. As with the interior passage 108, the exterior of the die 94 tapers inwardly from the first end 104 to the second end 106 and therefore creates an outer tapered surface 111. With this configuration, the die 94 can be inserted within the interior passage 72 of the capsule 62 such that the outer tapered surface 111 makes intimate contact with the inner surface of the first tapered portion 76 of the interior passage 72 as indicated in FIG. 4. As illustrated in this figure, once the die 94 and the core tube 92 are properly positioned within the capsule 62, a circumferential gap 113 is formed between the core tube 92 and die 94 which, as is described below, permits the introduction of molten polymeric material to the interior passage 108 of the die 94.

Returning again to FIG. 4, the interaction of the capsule 62 and the extruder head housing 20 will be described. As illustrated in this figure, the capsule 62 can be inserted into the interior passage 44 of the extruder head housing 20 through its entrance end 12 such that the ball portion 82 of the capsule 62 nests with the first socket portion 50 of the extruder head housing 20. In that both the ball portion 82 and this first socket portion 50 comprise spherical surfaces having substantially the same radii of curvature, intimate contact is made between the ball portion 82 and the first socket portion 50. To retain the capsule 62 in this nested orientation within the extruder head housing 20, a capsule nut 60 is provided. As indicated in FIG. 4, the capsule nut 60 includes its own interior passage 112 and is provided with a second socket portion 114 which, like the first socket portion 50, is sized and configured to make intimate contact with the ball portion 82 as shown in FIG. 4. To ensure this intimate contact and to maintain the capsule nut 60 in the desired orientation, the capsule nut 60 comprises a threaded portion 116 which threadlingly engages the threaded portion 58 formed within the interior passage 44 of the extruder head housing 20. In similar manner to the capsule nut 60, a core tube nut 118 normally is provided to securely hold the core tube 92 in place within the capsule 62. As indicated in FIG. 4, the core tube nut 118 is elongated and provided with a threaded portion 120 which threadlingly engages the threaded portion 74 of the interior passage 72 of the capsule 62. In addition, the core tube nut 118 further includes an interior passage 122 which tapers inwardly from a first end 124 of the core tube nut 118 to a second end 126 of the core tube nut 118 in similar manner as that of the core tube 92. Due to this orientation, a continuous tapered passage is formed by the core tube nut 118 and the core tube 92.

The extruder head 10 further comprises an adjustment mechanism 128. In a preferred arrangement, this adjustment mechanism 128 comprises a plurality of set screws 130 which normally are arranged in positions 90° from one another. For example, as shown in FIG. 2, the set screws 130 can be arranged at twelve o'clock, six o'clock, and nine o'clock. As indicated in FIG. 4, these set screws 130 extend through the extruder head housing 20 and into the interior passage 44. More particularly, the set screws 130 extend into the tapered portion 52 of the interior passage 44 adjacent the exit end 42. The tips of the set screws 130 normally engage the flats 87 of the second extension tube 86 of the capsule 62. As is known in the art, adjustment of the set screws 130 will effect displacement of the capsule 62 in a given direction. However, with the present apparatus, such adjustment pivots the capsule 62 about its central portion, i.e., the point at which the core tube element 102 exists and where the polymeric material is applied to the communications medium. Due to the ball portion 82 and the first and second socket portions 50 and 114, adjustment of the set screws 130 causes the capsule 62 to be displaced within the extruder head housing 20 in similar manner as a ball in a socket. Accordingly, the structural relationship between the capsule 62 and the extruder head housing 20 may be described as a ball and socket arrangement.

Figure 11:
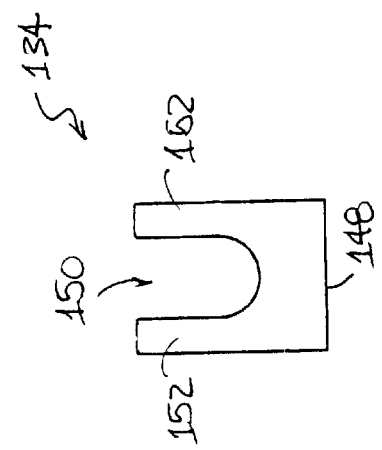
FIGS. 9–11 are various views of a wedge member of the extruder head shown in FIG. 4.
Figure 10:
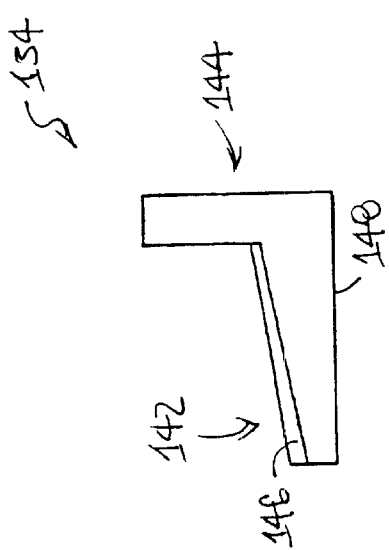
Figure 9:
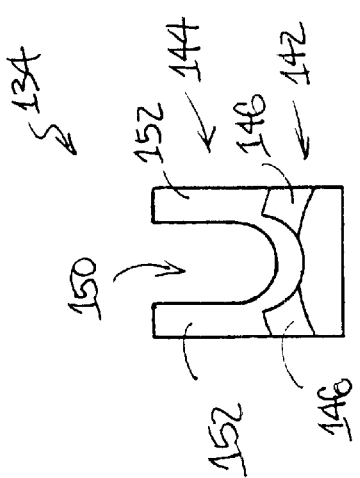

Due to space limitations, the extruder head 10 can be provided with three set screws 130 as illustrated in FIGS. 1 and 2. To provide adjustment in the fourth direction, i.e., the lateral direction in FIGS. 1 and 2, a wedge adjustment mechanism 132 can be used. As indicated in FIG. 4, the wedge adjustment mechanism 132 generally comprises a wedge member 134, a set screw 136, a retainer bar 138, and at least one fastener 140. The wedge member 134 is illustrated in detail in FIGS. 9–11. As depicted in these figures, the wedge member 134 generally comprises an insertion portion 142 and an exterior portion 144, which typically are arranged at right angles with each other. The insertion portion 142 is provided with at least one upper oblique surface 146 which is adapted to make contact with the inner surface of the tapered portion 52 of the interior passage 44, and a lower flat surface 148 which is adapted to make contact with a flat 87 of the capsule 62. The exterior portion 144 includes a set screw notch 150 that is adapted to receive the set screw 136 which divides the exterior portion 144 into first and second arms 152. With reference back to FIG. 4, the wedge member 134 can be inserted into the interior passage 44 of the extruder head housing 20 adjacent its exit end 14. Due to its oblique and flat surfaces 146 and 148, the wedge member 134 makes contact with the surface of the tapered portion 52 and the outer surface of the second tube extension 86 such that axial displacement of the wedge member 134 along the longitudinal axis of the extruder head 10 will effect displacement of the capsule 62. For instance, inward axial movement of the wedged member 134 will displace the exit end 66 of the capsule 62 in a direction away from the extruder head flange 18. To effect such axial displacement of the wedge member 134, the set screw 136 is threaded inwardly or outwardly from the extruder head housing 20 depending upon the direction of axial displacement desired. The set screw 136 is provided with a flange 154 which, as indicated in FIG. 4, is arranged so as to abut the exterior portion 144 of the wedge member 134 to ensure that outward threading of the set screw 136 retracts the wedge member 134 from the interior passage 44. To retain the set screw 136 within the set screw notch 150, the retainer bar 138 is placed over the ends of the first and second arms 152 and secured in place with the at least one fastener 140.

Figure 12:
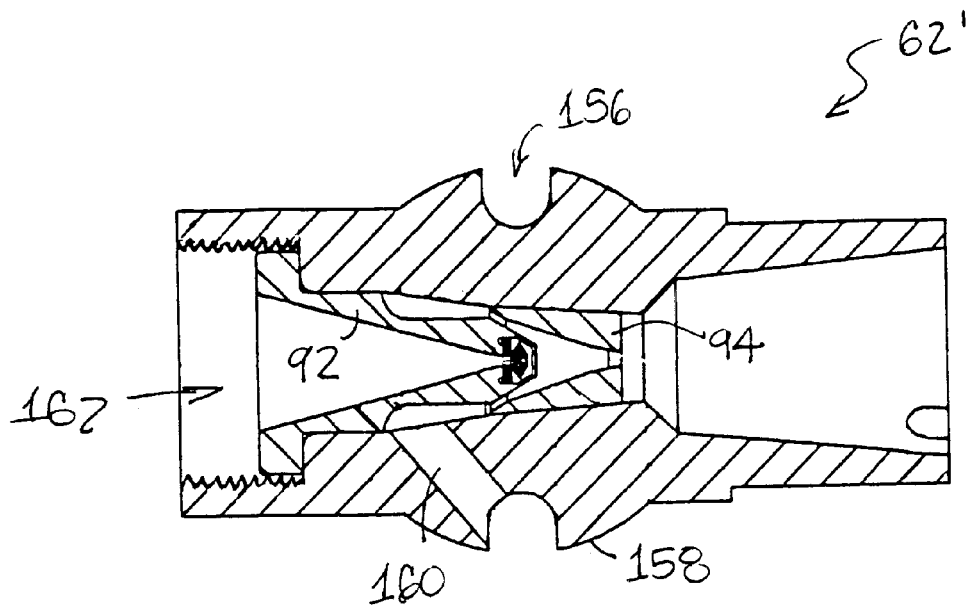
FIG. 12 is a cross-sectional view of a first alternative capsule.
Figure 13:
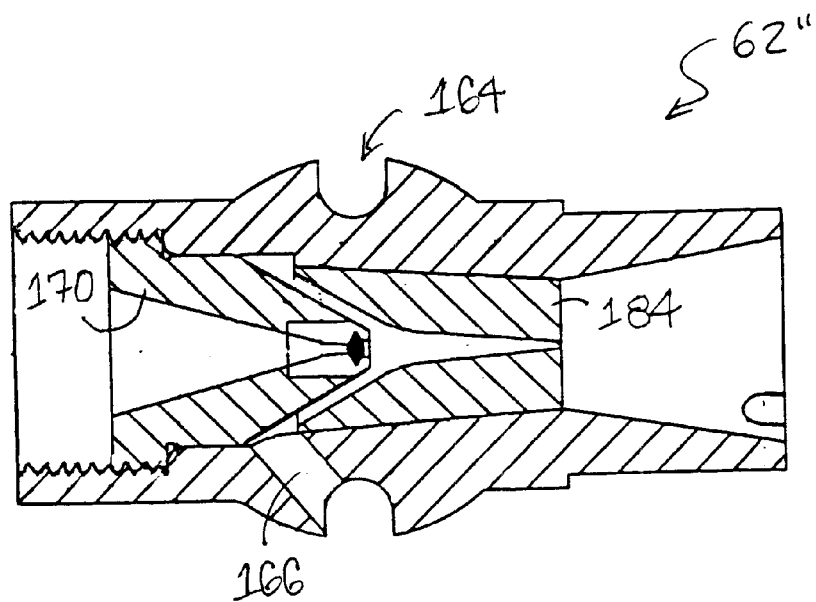
FIG. 13 is a cross-sectional view of a second alternative capsule.
Figure 14:
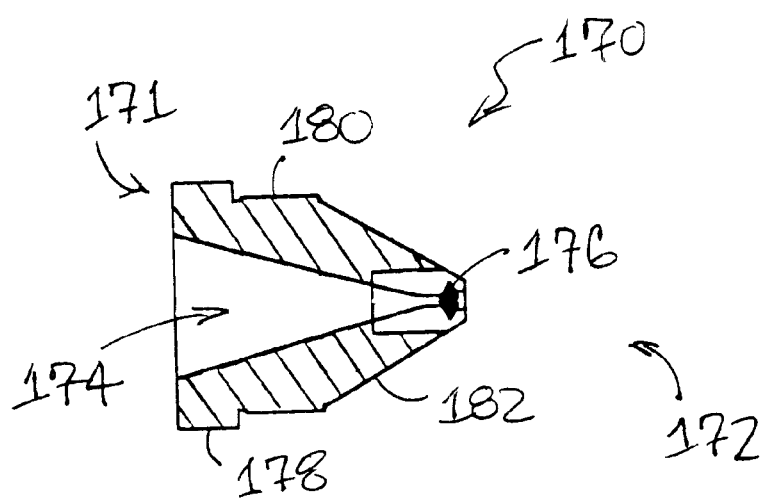
FIG. 14 is a cross-sectional view of an alternative core tube.
Figure 15:
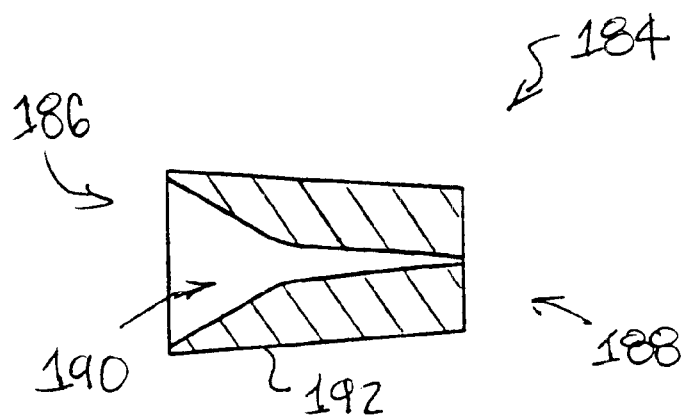
FIG. 15 is a cross-sectional view of an alternative die.

FIGS. 12 and 13 illustrate alternative arrangements for the capsule designated as 62' and 62", respectively. The capsule 62' is similar in construction to the capsule 62 shown in FIGS. 5 and 6. However, the groove 156 provided in the ball portion 158 of the capsule 62' extends through 360° around the ball portion 158. Accordingly, the groove 156 is an endless groove which traverses the entire circumference of the ball portion 158. Like the capsule 62, the capsule 62' shown in FIG. 12 includes one or more material ports 160. As shown in FIG. 12, the ports 160 extend from the groove 156 to the interior passage 162 of the capsule 62'. Again disposed within the capsule 62' is the core tube 92 shown in FIG. 7 and the die 94 shown in FIG. 8. In the second alternative, the capsule 62" can similarly comprise an endless groove 164 and a one or more ports 166. However, as shown in FIG. 13, the capsule 62" can be provided with an alternative core tube 170 and an alternative die 184. This core tube 170 and die 184 are illustrated in cross-section in FIGS. 14 and 15, respectively. As shown in FIG. 14, the core tube 170 comprises a first end 171 and a second end 172. Extending from the first end 171 to second end 172 is an internal passage 174 which leads to a core tube element 176 which is disposed adjacent the second end 172. The core tube 170 includes a flanged portion 178 which, like the flanged portion 103 of the core tube 92, is adapted to abut the interior shoulder 105 of its capsule. In addition, the core tube 170 comprises a central portion 180 which is substantially cylindrical in shape, and a tapered portion 182 which extends from the central portion 180 to the second end 172. The tapered portion 182 is sized and configured so as to make intimate contact with an interior surface of the internal passage of its respective capsule. Turning to FIG. 15, the die 184 comprises a first end 186 and second end 188. Extending from the first end 186 to the second end 188 is interior passage 190. The interior passage tapers inwardly from the first end 186 to the second end 188. The external surface 192 of the die 184 similarly tapers inwardly from the first end 186 to the second end 188 so as to be adapted to make intimate contact with the interior of its related capsule.

Operation

Figure 16:
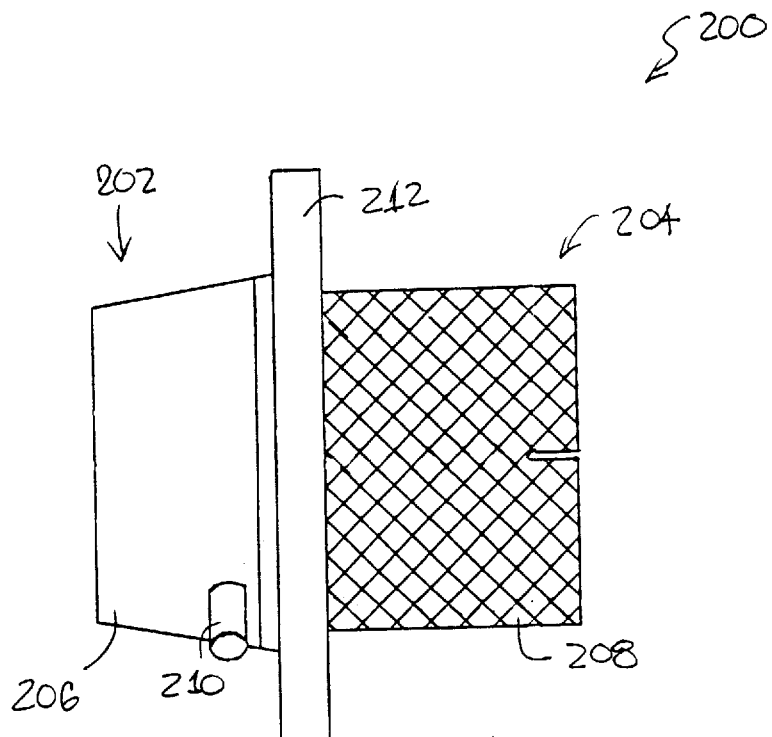
FIG. 16 is a side view of an alignment tool used to adjust the extruder head shown in FIGS. 1–4.
Figure 17:
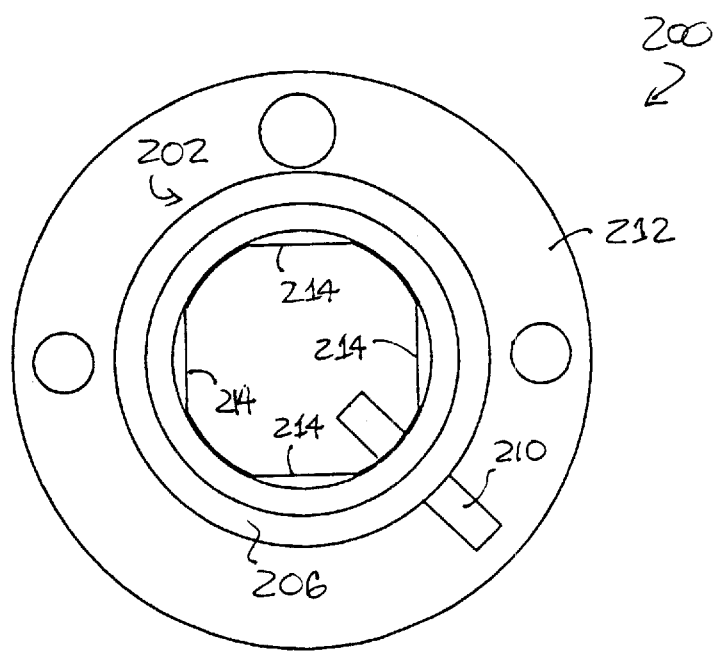
FIG. 17 is a front end view of the alignment tool shown in FIG. 16.

The structural features of the extruder head 10 having been described above, operation and use of the extruder head will now be discussed. Before using the extruder head 10 to apply coatings to a communications medium, for example a metal wire, the capsule 62 should be placed in an initial aligned orientation in which the central longitudinal axis of the capsule substantially coincides with the central longitudinal axis of the interior passage 44 of the extruder head housing 20. To orient the capsule 62, each of the set screws 130 provided in the extruder head housing 20 is loosened to the extent to which each is entirely retracted out from the interior passage 44 of the extruder head housing 20. In addition, the wedge adjustment mechanism 132 is removed from the extruder head housing 20 by threading the set screw 136 outwardly until the set screw 136 is removed from its threaded aperture. Once the set screws 130 have been retracted and the wedge adjustment mechanism 132 has been removed, an alignment tool 200, shown in FIGS. 16 and 17, can be inserted into the interior passage 44 at the exit end 42 of the housing 20. As indicated in these figures, the alignment tool 200 comprises an insertion portion 202 and a grip portion 204. The insertion portion 202 is provided with an annular tapered surface 206 which tapers inwardly away from the grip portion 204. The grip portion 204 can be provided with a knurled surface with which the alignment tool 200 can be securely gripped by the operator. Extending outwardly from the insertion portion 202 at a predetermined orientation is an alignment pin 210. As indicated in FIG. 17, this alignment pin 210 extends both outwardly from the insertion portion and inwardly inside the alignment tool 200. Separating the insertion portion 200 and the grip portion 204 is a flange 212. As is further shown in FIG. 17, the interior of the alignment tool 200 is provided with a plurality of flats 214 which, in a preferred arrangement are formed within the alignment tool 200 separated from each other by 90°.

The insertion portion 202 of the alignment tool 200 is inserted into the interior passage 44 of the extruder head housing 20. To ensure that the alignment tool 200 is correctly inserted into the interior passage 44, the alignment pin 210 will prevent such insertion unless the alignment tool 200 is oriented such that this alignment pin 210 aligns with the alignment notch 80 provided in the capsule 62 and the alignment notch 56 provided in the extruder head housing 20. When its alignment is correct, the insertion portion 202 will pass into the interior passage 44 such that the annular tapered surface 206 of the alignment tool 200 will come into contact with the inner surface of the tapered portion 52 of the interior passage 44. At this point, the alignment tool 200 can be tightened into position with fasteners (not shown) that extend through openings 216 formed in the flange 212. Once the fasteners are tightened, the capsule 62 can be inserted into the interior passage 44 through its entrance end 40. With the alignment tool 200 already in position, the correct orientation of the capsule 62 within the housing 20 can be achieved. At this point, the capsule nut 60 can be tightened until snug (although not fully tightened) to secure the capsule 62 in the initial orientation. Next, the alignment tool 200 is removed from the extruder head housing 20, the set screws 130 hand-tightened to make contact with the capsule 62, and the wedge adjustment mechanism 132 replaced such that contact is made between the wedge member 134 and the capsule 62.

At this point, the extruder head 10 is prepared for use. The communications medium, such as a metal wire, enters the extruder head 10 through the entrance end 12 and passes through the capsule 62 to exit the extruder capsule 62 and extruder head at the exit end 14. While the medium passes through the extruder head 10, molten polymeric material is passed through the funnel section 26 of the extruder head flange 18, through the passage 28, into the passage 46 of the extruder head housing 20, and into the interior groove 48 provided in the housing 20. In that this material is under pressure, it will fill the interior groove 48 as well as the groove 88 provided in the ball portion 82 of the capsule 62. Furthermore, the polymeric material will flow into the material ports 90 and will therefore fill the circumferential gap 113 formed between the core tube 92 and the die 94. After the communications medium passes through the core tube element 102 provided at the second end of the core tube 92, it is surrounded by molten polymeric material within the die 94. As it passes through the narrow aperture 110 formed in the die 94, the appropriate amount of polymeric material is evenly deposited on the surface of the communications medium with a desired thickness.

With the structure and operation described above, greatly improved results can be realized. First, very even coating of the communications medium can be obtained due to the precise adjustability afforded by the ball and socket arrangement. Moreover, such adjustments can be made "on the fly" without having to shut down any manufacturing lines, thereby increasing production and reducing delays. In addition, due to the structural configuration of the exterior of the extruder head, more even heating of the extruder head can be obtained which, in turn, results in fewer cold spots being formed therein. Furthermore, unnecessary contact between the communications medium and the internal parts of the extruder head is avoided such that undue stresses are not imparted to the medium. Finally, due to the simplicity of the design described herein, the cost of manufacturing the herein disclosed apparatus significantly reduces its cost to the end customer.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims.

What is claimed is:

1. An extruder head for applying a coating of material from a source of molten material on a communications medium, comprising:

an extruder head housing having an entrance end, an exit end, and an interior passage that extends from said entrance end to said exit end;

a capsule disposed within said extruder head housing in said interior passage and being pivotally mounted therein at a central portion of said capsule, said capsule having a ball portion formed at said central portion thereof, an entrance end, an exit end, and an interior passage that extends from said capsule entrance end to said capsule exit end, said capsule including a die disposed within its interior passage, said die having an aperture through which the communications medium can pass which is generally axially aligned with said central portion of said capsule; and an adjustment mechanism for adjusting the orientation of said capsule within said extruder head housing.

2. The extruder head of claim 1, wherein said extruder head housing includes at least one socket portion formed within said housing interior passage, said at least one socket portion being sized and shaped to receive said ball portion of said capsule.

3. The extruder head of claim 1, further comprising a capsule nut that threadingly engages said extruder head housing to secure said capsule in a desired position within said housing interior passage, wherein said capsule nut includes at least one socket portion that is sized and shaped to contact said capsule ball portion.

4. The extruder head of claim 1, wherein said ball portion of said capsule is provided with an annular groove that extends about at least a portion of the circumference of said ball portion.

5. The extruder head of claim 4, wherein a material port extends from said annular groove of said capsule to said capsule interior passage.

6. The extruder head of claim 1, further comprising a core tube disposed within said capsule interior passage at a point upstream from said die, said core tube and said die being separated within said capsule by a circumferential gap.

7. The extruder head of claim 1, further comprising a core tube nut which threadingly engages said capsule to retain a core tube in a desired orientation within said capsule.

8. The extruder head of claim 1, wherein said capsule includes an extension tube having a plurality of flats formed on its exterior surface.

9. An extruder head for applying a coating of material from a source of molten material on a communications medium, comprising:

an extruder head housing having an entrance end, an exit end, and an interior passage that extends from said entrance end to said exit end, said extruder head housing further having a first socket portion formed within said interior passage and a capsule nut;

a capsule disposed within said extruder head housing in said interior passage, said capsule having an entrance end, an exit end, a ball portion, and an interior passage that extends from said capsule entrance end to said capsule exit end, said capsule including a die disposed within its interior passage, said die having an aperture through which the communications medium can pass which is positioned within said ball portion of said capsule, said ball portion nesting against said first socket portion such that said capsule and extruder head housing form a ball and socket relationship and said capsule can be pivoted about said ball portion;

an adjustment mechanism for adjusting the orientation of said capsule within said extruder head housing; and wherein said capsule nut threadingly engages said extruder head housing to secure said capsule in a desired position within said housing interior passage, and wherein said capsule nut includes a second socket portion that is sized and shaped to contact said capsule ball portion.

10. The extruder head of claim 9, wherein said ball portion of said capsule is provided with an annular groove that extends about at least a portion of the circumference of said ball portion.

11. The extruder head of claim 10, wherein a material port extends from said annular groove of said capsule to said capsule interior passage.

12. The extruder head of claim 9, further comprising a core tube disposed within said capsule interior passage at a point upstream from said die, said core tube and said die being separated within said by a circumferential gap.

13. The extruder head of claim 12, further comprising a core tube nut that threadingly engages said capsule to retain said core tube in a desired position within said capsule interior passage.

14. The extruder head of claim 9, wherein said capsule includes an extension tube extending outwardly from said ball portion having a plurality of flats formed on its exterior surface.

15. The extruder head of claim 9, wherein said adjustment mechanism includes a plurality of set screws which extend through said extruder head housing and into said housing interior passage.

16. The extruder head of claim 9, wherein said adjustment mechanism includes a wedge adjustment mechanism that includes a wedge member that is sized and shaped to extend into said housing interior passage to make contact with said capsule to change its the orientation.

17. The extruder head of claim 16, wherein said wedge adjustment mechanism further includes a fastener that threads into said extruder housing, wherein inward and outward threading effects axial displacement of said wedge member which, in turn, adjusts the orientation of said capsule.

18. A capsule for use in an extruder head, comprising:
   an entrance end, an exit end, and an interior passage that extends from said entrance end to said exit end;
   a ball portion formed between said entrance end and said exit end;
   a die disposed within said interior passage, said die having an interior passage extending therethrough, said die being positioned within said capsule interior passage such that said die is positioned in substantial axial alignment with said ball portion of said capsule; and
   a core tube disposed within said capsule interior passage at a position upstream from said die, said core tube and said die being separated so as to form a gap therebetween.

19. The capsule of claim 18, further comprising at least one extension tube which extends outwardly from said ball portion, said extension tube having a plurality of flats formed on its outer surface.

20. The capsule of claim 18, further comprising a core tube nut which threadingly engages said core tube to secure it in a desired position within said capsule.

21. The capsule of claim 18, wherein said ball portion of said capsule is provided with an annular groove that extends about at least a portion of the circumference of said ball portion.

22. The capsule of claim 21, wherein a material port extends from said annular groove of said capsule to said capsule interior passage.

* * * * *

UNITED STATES PATENT AND TRADEMARK OFFICE
CERTIFICATE OF CORRECTION

PATENT NO.     : 6,514,341 B1
DATED          : February 4, 2003
INVENTOR(S)    : Scott Karstens and Craig Alberhasky It is certified that error appears in the above-identified patent and that said Letters Patent is hereby corrected as shown below:

<u>Title page,</u>
Item [54], should read -- METHOD AND APPARATUS FOR COATING DATA CABLE THROUGH THE EXTRUSION PROCESS --

Signed and Sealed this

Thirteenth Day of May, 2003

JAMES E. ROGAN
*Director of the United States Patent and Trademark Office*